United States Patent [19]

Pearce

[11] Patent Number: 4,489,789
[45] Date of Patent: Dec. 25, 1984

[54] TILLAGE AND PLANTER CARRIER

[76] Inventor: Ronald E. Pearce, Rte. 3, Cisne, Ill. 62823

[21] Appl. No.: 383,967

[22] Filed: Aug. 13, 1982

[51] Int. Cl.³ .......................... A01B 49/06; A01B 73/00
[52] U.S. Cl. .................................... 172/443; 172/677
[58] Field of Search ................. 172/142, 443, 47, 677, 172/49.5

[56] References Cited

U.S. PATENT DOCUMENTS

| 2,785,614 | 3/1957 | Jensen | 172/443 |
| 3,314,386 | 4/1967 | Kopaska | 111/52 |
| 3,523,585 | 8/1970 | Godbersen | 172/456 |
| 3,528,507 | 9/1970 | Morkoski | 172/413 |
| 4,227,581 | 10/1980 | Klotzbach | 172/142 |

FOREIGN PATENT DOCUMENTS

| 53475 | 9/1974 | Australia | 172/142 |
| 2735366 | 2/1978 | Fed. Rep. of Germany | 172/49.5 |
| 494136 | 3/1976 | U.S.S.R. | 172/443 |

OTHER PUBLICATIONS

The SBC Cultivating System, Advertising Brochure of Kongskilde, Exeter, Ontario, Canada.
M & W Till "N" Tote, Advertising Sheet of M & W Gear, Gibson City, IL.
Glencoe Danish Shank Field Cultivator with Double Rolling Baskets, Advertising Brochure of Glencoe, Bloomington, IL, 1/1980.
Heath Till Planter, Advertising Sheet of HFE, Fort Collins, CO.
Tye, "Till & Drill" Attachment, Advertisement of the Tye Co., Lockney, TX, 12/1981.

Primary Examiner—Richard J. Johnson

[57] ABSTRACT

An implement carrying apparatus adapted to be drawn along a field by a tractor or like vehicle hitched to the leading end. A seed planting machine is detachably mounted to the trailing end and tillage implement suspended from an upwardly arched portion of the main frame forwardly of the planting machine. A pair of wheels at the rear of the frame apparatus forwardly of the planting machine and rearwardly of the tillage tool serve as mobile means for tillage and planting equipment when either or both are in raised position. Tillage tool's vertical movement is controlled by lifting means constructed between two main frame members at the top of the arched portion of the main frame. Planting machine's vertical movement is controlled by three point hitch means constructed at rear of apparatus. Vertical movment of tillage and planting equipment is controlled either simultaneously or independently of each other.

1 Claim, 6 Drawing Figures

TILLAGE AND PLANTER CARRIER

BACKGROUND OF THE INVENTION

This invention relates to the art of agricultural machinery, and more particularly to an improved apparatus for carrying a preplanting tillage implement and a seed planting machine.

Recent high costs for fuel and the need to save time have brought about the need to combine final preplanting tillage and possibly chemical application with the seed planting operation.

Some equipment has been developed to combine final preplanting tillage and seed planting, For example, M & W "Till-N-Tote" advertised by M & W Gear, Gibson City, IL (PTO 10/81) and BLAUW, German Pat. No. 2735366.

The M&W "Till-N-Tote" may work well where fields are level with no sod waterways or drainage ditches, however, not all fields are level and most contain drainage ditches or sod waterways. The tillage apparatus of the "Till-N-Tote", being firmly connected to its frame, apparently can only be raised or lowered simultaneously with the planting machine. One skilled in the art will realize that it is advantageous to be able to raise or lower the tillage apparatus and the planting machine both simultaneously or independently of each other. It is always desirable to plant seed up to a sod waterway, then raise the seed planter and pass over to the opposite side of the sod waterway, lower the planter and continue across the field. The "Till-N-Tote" continues to till while the planter is in lowered position and therefore might damage a sod waterway. While crossing a sodless drainage ditch it is sometimes desirable to plant through without raising the planting machine. The tillage apparatus of the "Till-N-Tote" might tend to dump soil into the ditch.

The BLAUW machine utilizes a tillage apparatus which is mounted to the tractor. The single beam forward frame member of the planter carrying device is not designed for supporting a tillage implement.

SUMMARY OF THE INVENTION

A primary objective of this invention is to provide a means to perform preplanting tillage and seed planting in one operation.

Another primary objective of this invention is to allow an operator to raise or lower tillage equipment and seed planting equipment simultaneously or independently of each other.

Another objective of this invention is to provide an improved apparatus for carrying preplanting tillage equipment and seed planting equipment along a field.

A further objective of this invention is to provide a more suitable ground preparing apparatus for use under difficult unlevel conditions.

A further objective of this invention is to provide means to allow a tool to follow the contour of the ground in a "floating action".

This invention provides a frame apparatus adapted to be drawn along a field by a tractor or like vehicle connected at the leading end with tillage equipment suspended from center area forwardly of a seed planting machine detachably connected to the rearward end. Two wheels forwardly of the planting machine attachment and rearwardly of the tillage equipment provide mobile means for planting and tillage equipment when either or both are in raised position. The apparatus includes a main frame assembly to be connected at the leading end to a tractor or like vehicle and a seed planter to be connected to trailing end and also includes a second frame assembly which is pivotally connected at its the forward end to the bottom of the forward end of the main frame in a manner that allows the rearward end which is connected to a tillage implement to be raised and lowered by remotely operable power means positioned above on the arched portion of the main frame assembly. The second frame with the tillage implement is connected to power means in a manner which allows said implement to "float" with the contour of land.

DRAWINGS

DESCRIPTION OF THE PREFERRED EMBODIMENT

Figure 1:
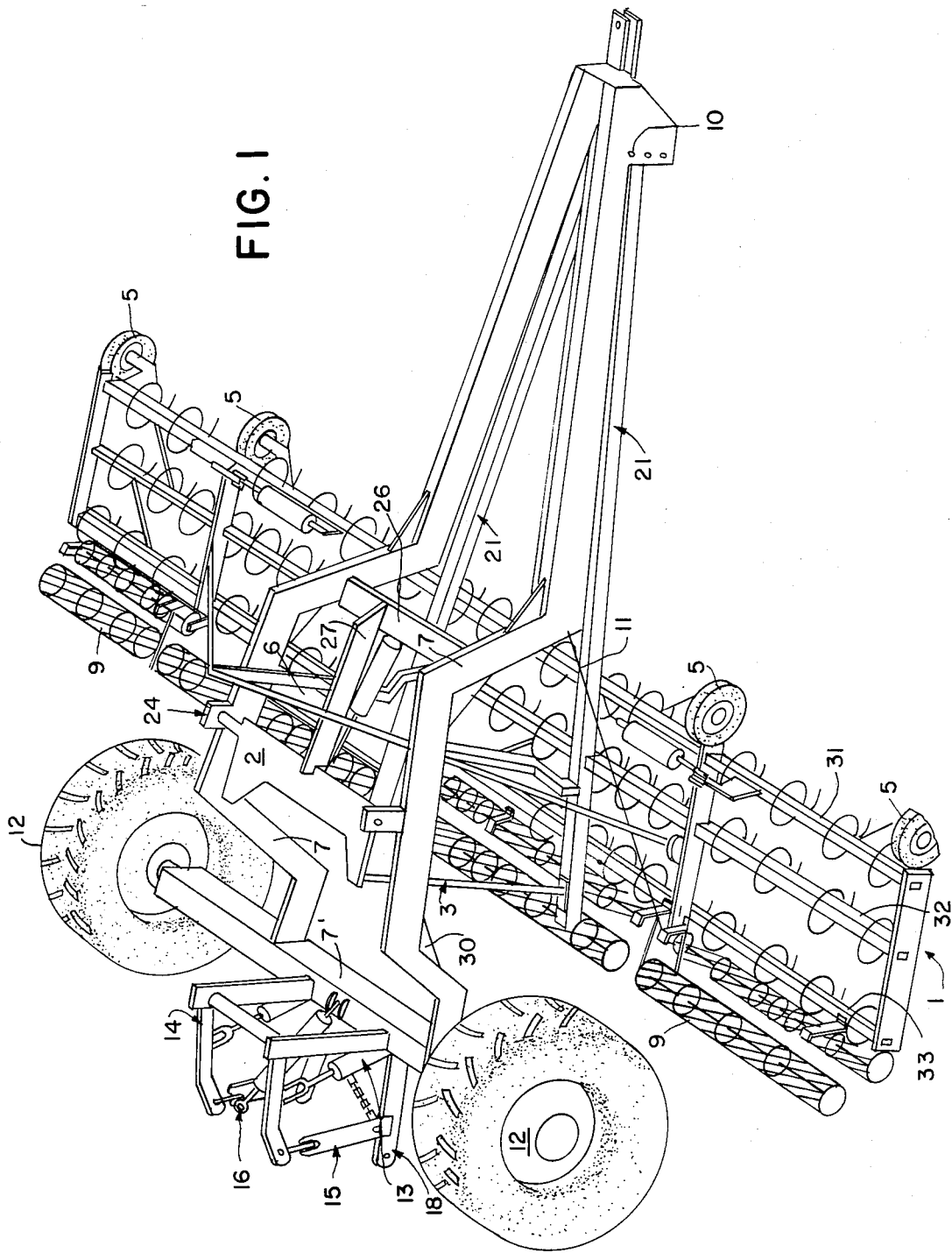
FIG. 1 is a perspective of apparatus with implement.
Figure 2:
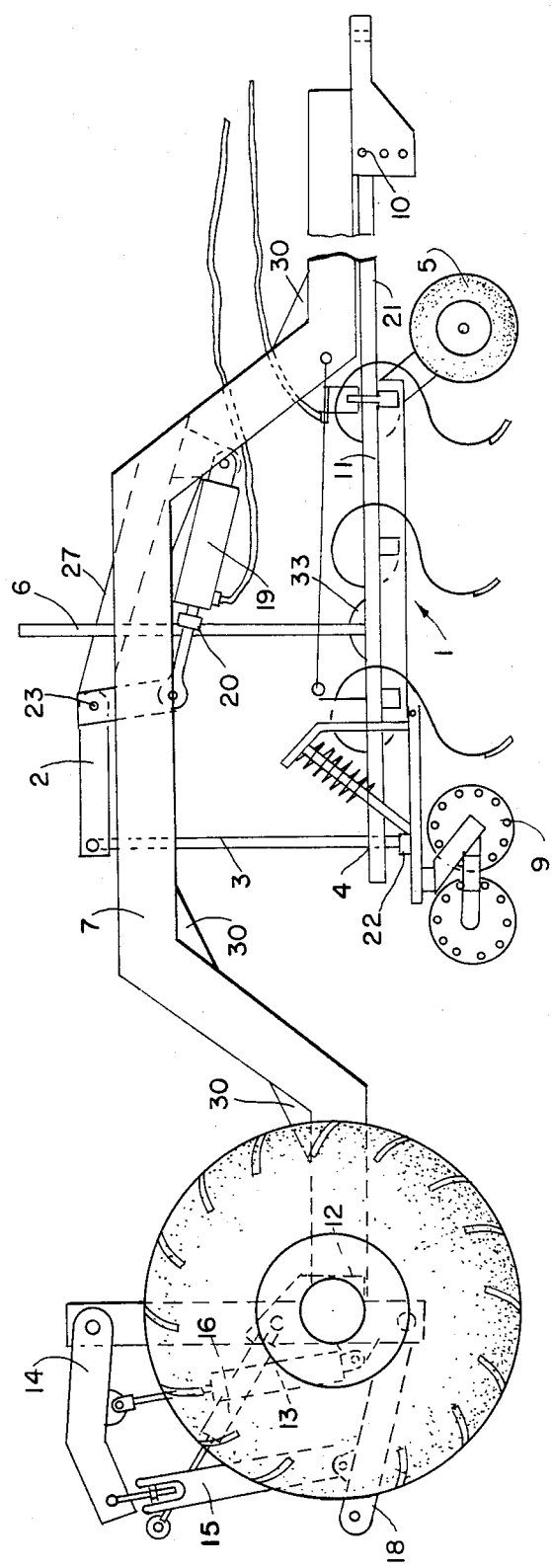
FIG. 2 is a side view with recommended tillage implement.
Figure 3:
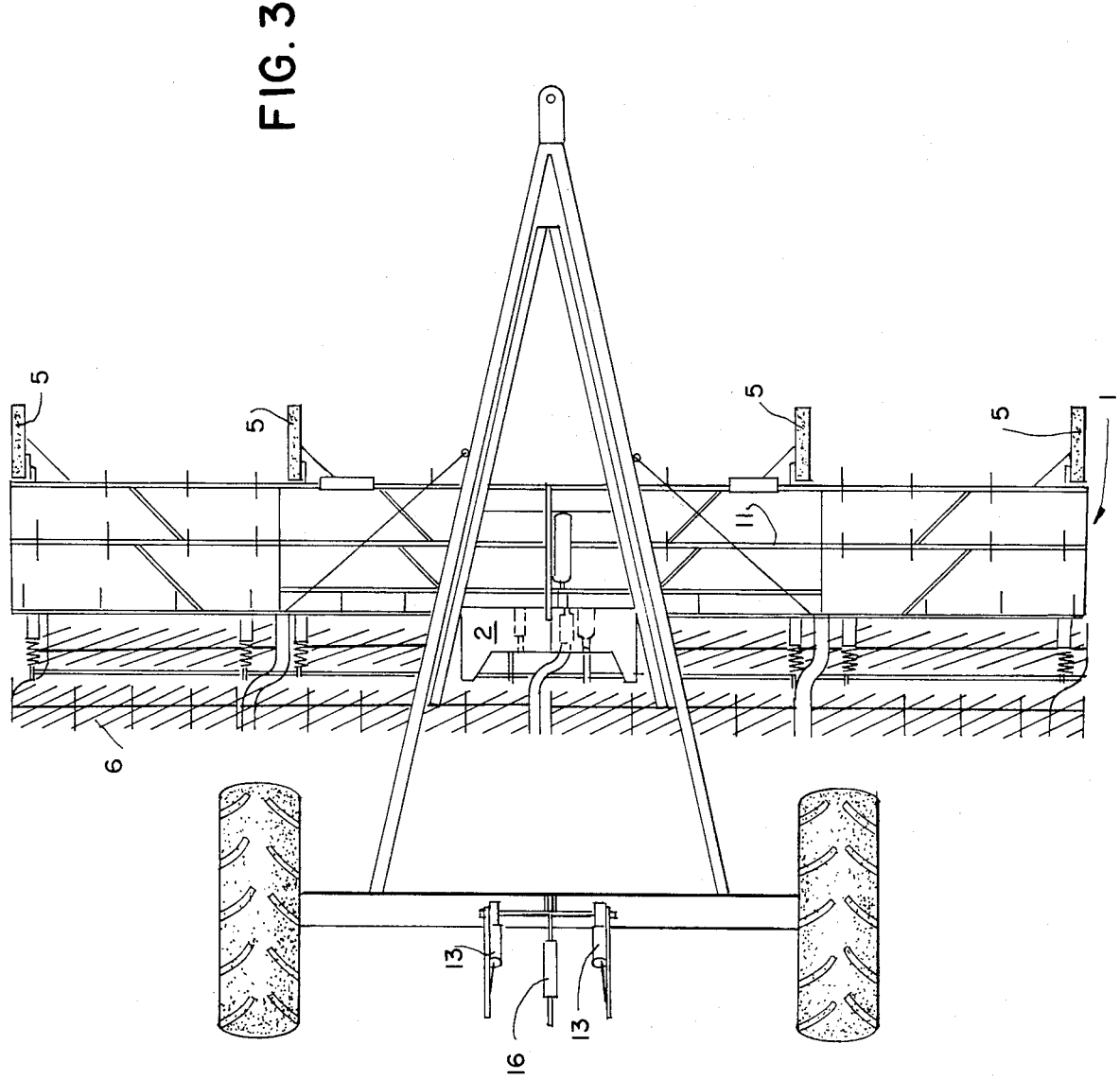
FIG. 3 is a top view.

Referring to FIGS. 1, 2, and 3, there is shown the apparatus to be used for carrying tillage implement 1, with the leading end of the apparatus connected to tractor or like vehicle and the trailing end the to be connected to a planting machine. The implement is comprised of two main frame members 7 of heavy gauge rectangular steel tubing connected together at their forward ends and rearwardly diverging longitudinally to their rearward ends which are laterally spaced and connected to a rigid axle. Large wheels 12 are rotatably connected to each end of said transverse beam. Arches (FIGS. 1 & 2) are formed by main frame members 7 forwardly of transverse beam and wheels 12 to accomodate the tillage implement which is positioned transversely.

Figure 6:
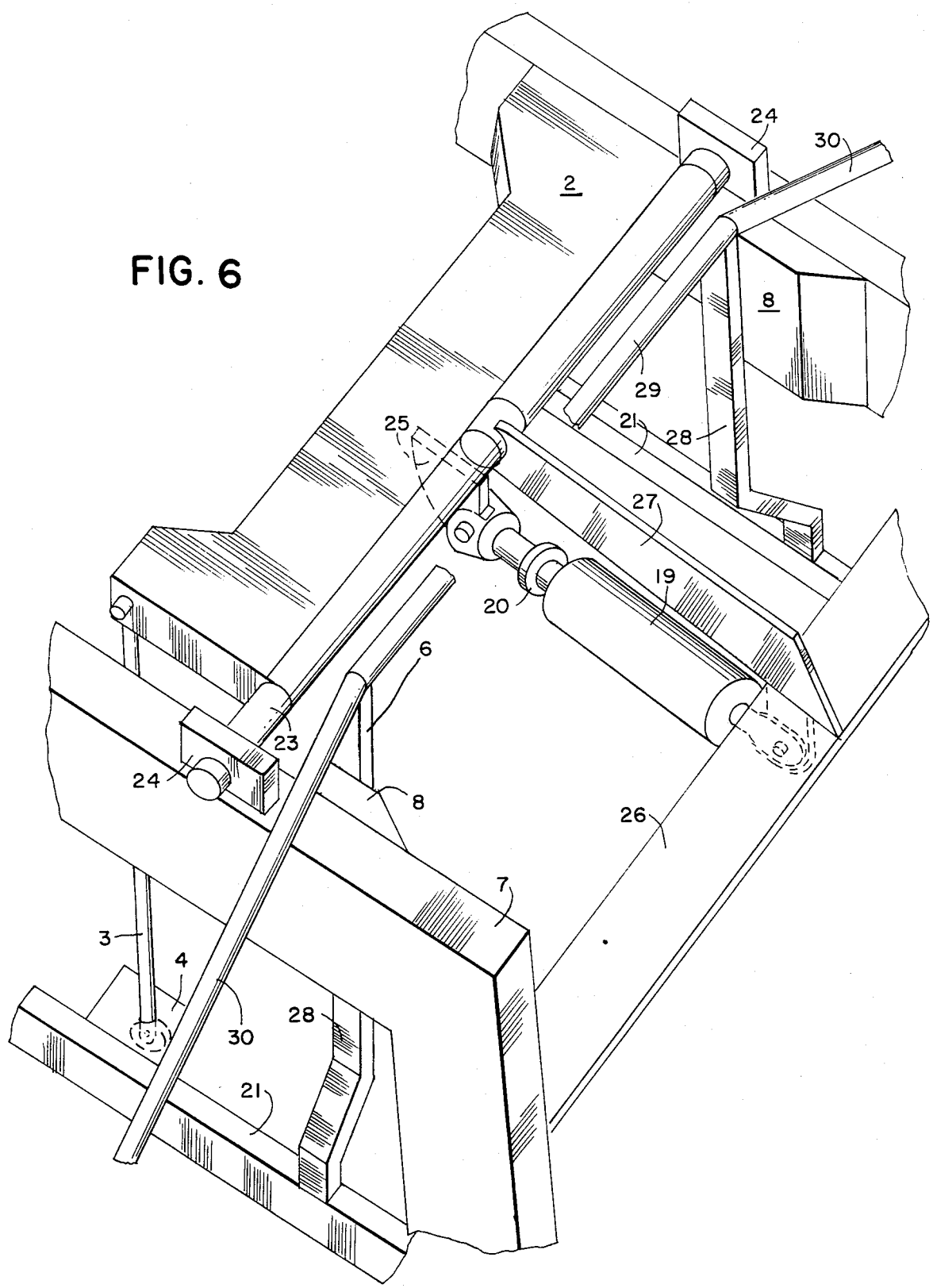
FIG. 6 is a perspective of the tillage implement lifting device.

Two secondary frame members 21 (FIGS. 1 & 2) are connected laterally spaced to top of tillage implement 1 frame members then extend below and diverging generally parallel with plane of main frame 7 with their forward ends connected at actual pull point 10 on main frame. Pull point 10 has height adjustment arrangement to accomodate tractor draw bar height. This arrangement is comprised of a series of apertures arranged vertically in steel plates extending downwardly from each side of main frame adjacent to hitching device. A pin inserted through said apertures and through apertures in forward ends of secondary frame members 21 completes the adjustment. At the rearward ends of secondary frame members 21 steel plates 4 are connected to the inward sides. In each plate 4 are apertures to accept lifting rods 3 (FIGS. 2 & 6). Lifting rods 3 (FIG. 2) are equipped with a nut 22 or like means attached to the lower end. Upward travel of lifting arms 3 causes nut 22 or like means at its lower end to make contact with bottom of plate 4, thus causing upward movement of the tillage implement in relation to the ground.

Situated at the top side of the "arch" of the main frame 7, (see FIGS. 2 & 6) is a wing-like lifting device 2 which is pivotally attached at its forward corners to main frame members via round shaft element 23 connected to leading edge of lifting device 2 and extending through apertures in bearing like blocks 24 situated laterally and paralled to each opposing other and attached to the top of each main frame member. Welded perpendicularly downward from the bottom side and lateral center of said lifting device 2 is a bracket-like plate 25 for pivotally connecting the rod end of hydraulic cylinder 19. The other end of said cylinder extends forwardly and is connected to lateral brace 26, fixed solid between two main frame members 7, at a point forwardly of lifting device 2. An additional brace 27 is pivotally connected at its rearward end to the lateral center of the front shaft element 23 of lifting device 2 and extends generally parallel and above said hydraulite cylinder 19, to said lateral brace 26 where it is fixed solid. Movement of said hydraulic cylinder will cause rearward corners of lifting device 2 to move upward or downward in relation to the ground. Upper ends of lifting arms 3 are pivotally connected to rearward corners of lifting device 2, causing upward and downward movement of tillge implement 1 in relation to the ground. Apertures in plates 4 on secondary frame members 21 together with lifting rods 3 retracting into said apertures while tillage implement 1 is in lowered position allow tillage tool 1 to "float" with the contour of the land. An adjustable depth stop 20, connected to the piston rod of said hydraulic cylinder on prototype machine permits desirable tillage implement penetration.

Anti-sway stabilizer 6 (see FIGS. 1, 2, & 6) is comprised of two square tubular vertical elements 28 connected to the upper side of each secondary frame element 21 at the approximate longitudinal mid point of the tillage implement and extending upward to a point above the top of "arch" in main frame 7. The upper ends of the stabilizer vertical elements 28 are connected to opposite ends of a lateral brace 29. Additional bracing 30 is connected at junctions of lateral brace 29 and the upper ends of stabilizer vertical elements 28 (see FIG. 6) and extends laterally outwardly and downwardly to points on the frame of tillage implement 1.

Wear plates 8 (FIG. 6) are attached to opposite inner sides of main frame 7 at areas adjacent to vertical stabilizer elements 28 to prevent excessive lateral movement of tillage implement 1. In order to insure added stability, the leading end of adjustable cables 11 are connected to the outward sides of main frame 7 at a point forwardly of "arch" and extend rearwardly and outwardly in relation to vehicle travel to a point on outer width of tillage implement 1.

Figure 5:
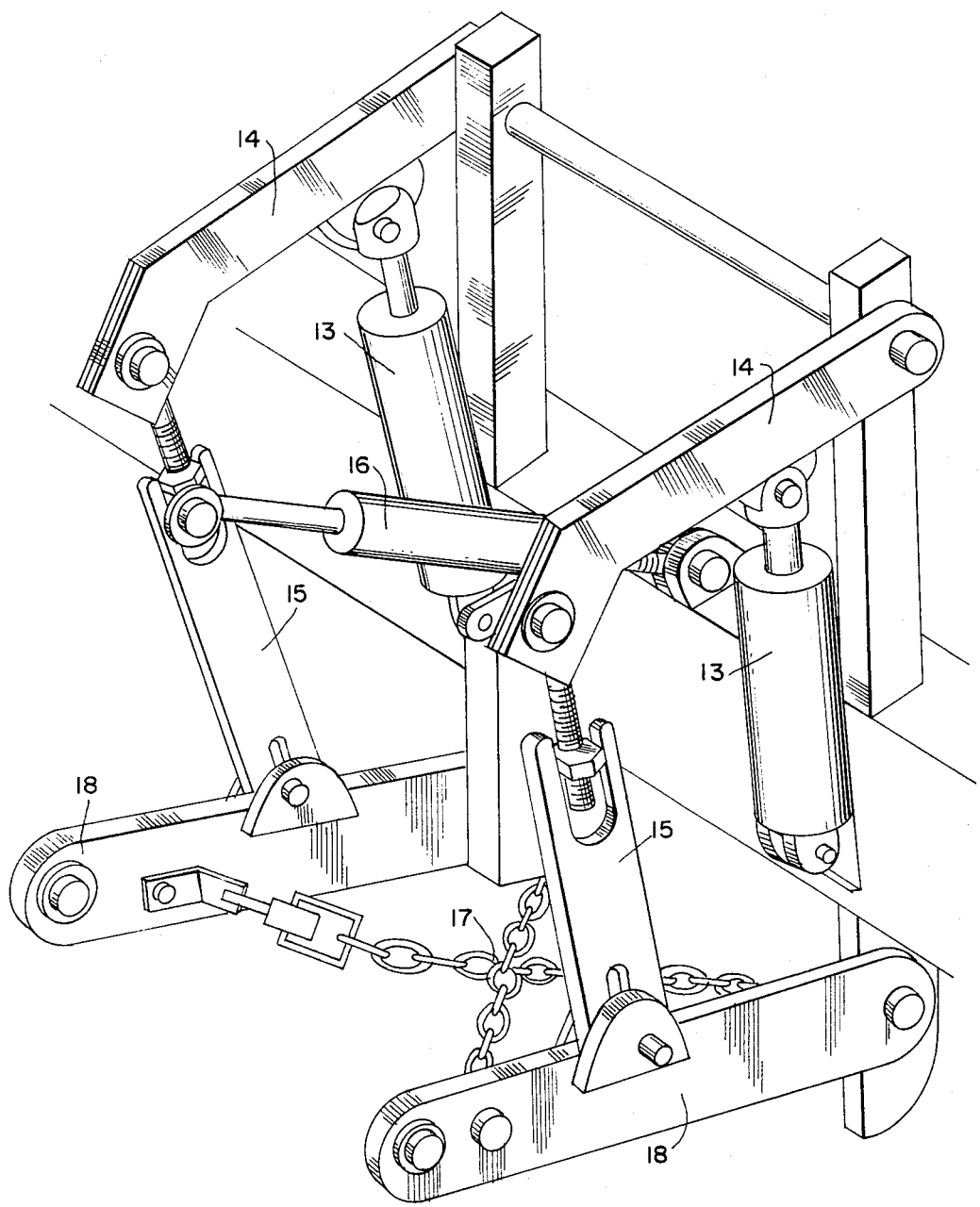
FIG. 5 is a perspective of the planter hitch and lifting device.

Mounted on transverse beam is three point hitch means (see FIG. 5) to raise and lower as well as carry a planting machine. Two hydraulic cylinders 13 working together, raise or lower rockshaft arms 14 which in turn pull up or down on adjustable lift links 15 controlling upward or downward movement of lift arms 18. Lower connections on lift links 15 are slotted to permit wheel 12 on either side to roll over humps or obstacle without affecting the planting machine. Upper ends of lift links 15 are adjustable. Adjustable anti-sway chains 17 limit the amount of sway of the planter in transit or in operation. Swivel connections are provided at rockshaft arms 14 to lift links 15 and lift arms 18 to axle connections for easy planter hookup.

Figure 4:
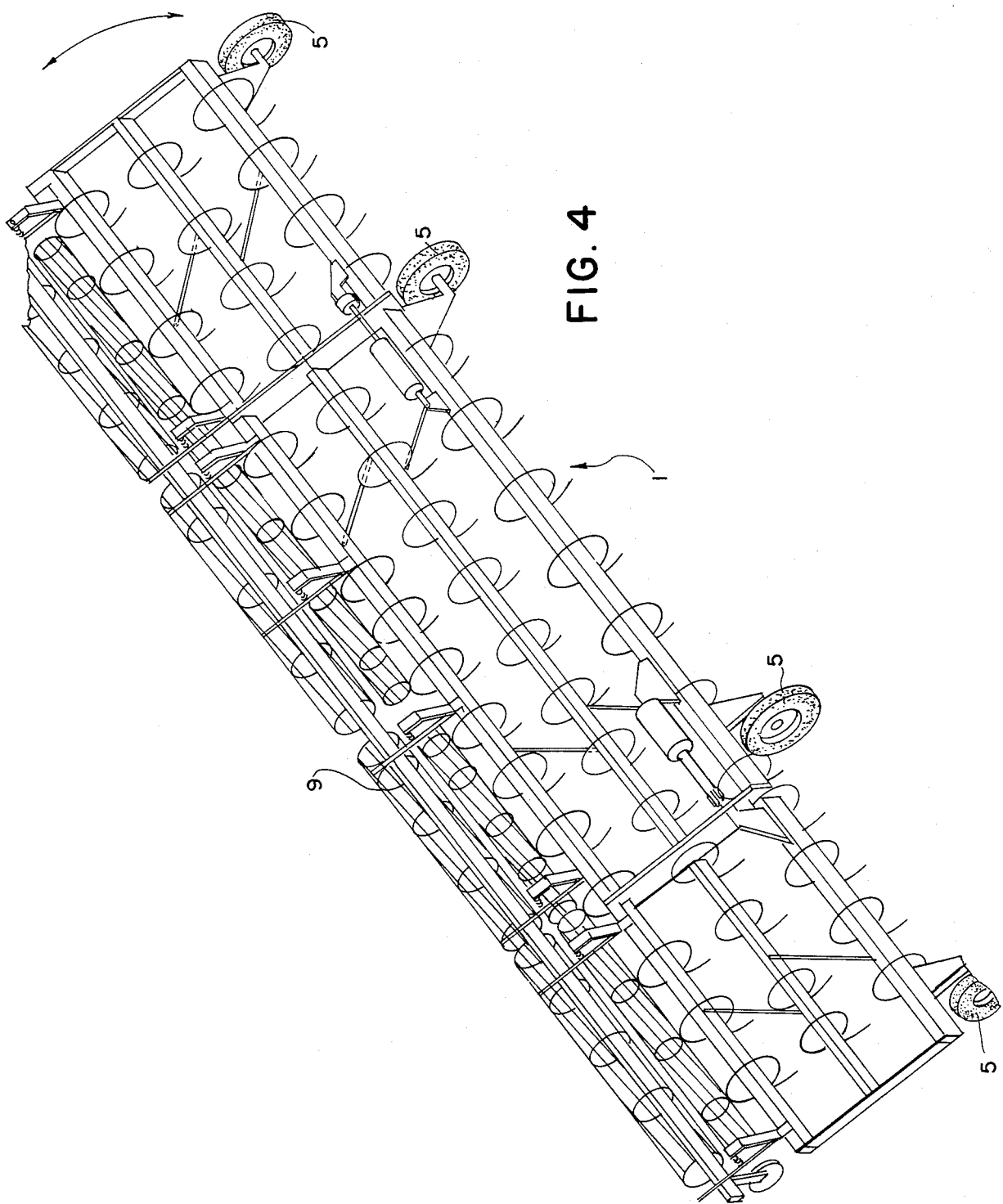
FIG. 4 is a perspective of recommended tillage implement.

Recommended tillage implement 1 (see FIG. 4) is comprised of three rows of Danish tine attached to square tubing frame members. Mounted behind tine are two rows of basket rollers 9 situated so that the second row does not follow the exact path of the first row. Basket rollers 9 can be adjusted up or down and downward pressure via springs (see FIG. 2) can be adjusted. On the leading frame members of tillage implement 1 are mounted adjustable gauge wheels 5. Outer ends of tillage implement 1 can be folded up during transit (FIG. 4).

Tillage implement 1 is centered beneath "arch" of main frame 7 and attached to secondary frame members 21 which in turn are attached at pull point 10 (FIG. 2) in a manner which permits upward and downward movement of tillage implement 1 in relation to the ground.

Although this invention has been described and illustrated in its present form, it is not to be limited since changes and modifications may be made therein which are within the full intended scope of the invention.

I claim:

1. An agricultural apparatus adapted to support multiple longitudinally spaced implements for selective vertical movement from lowered positions of use to raised positions for transport, said apparatus comprising: A pair of rearwardly diverging longitudinally extending main frame members connected at their forward ends and provided with towing hitch means, the rearwards ends of said main frame members being connected to a transverse beam having laterally spaced support wheels rotatably secured thereto, the central portion of said main frame members being arched upwardly from the forward and rearward ends thereof and provided at the upper portion of the arch with means for suspending a tillage implement positioned transversely of said apparatus and extending laterally on each side of said main frame members, said tillage implement including a pair of secondary frame members pivotally connected at their forward ends to said main frame members adjacent said hitch means and diverging rearwardly beneath said main frame members, said tillage implement comprising a plurality of generally parallel tool bar frame members having earthworking tools secured thereto, said tool bar frame being rigidly connected to said secondary frame for vertical movement therewith, said tillage frame suspending means including vertically extending connecting elements secured to said secondary frame to permit floating operation during use and including remotely operable power means to raise said tillage implement for transport, and three point hitch means secured to said transverse beam adapted to have a planter secured thereto and being independently remotely operable to raise and lower the planter.

* * * * *